No. 783,693. Patented February 28, 1905.

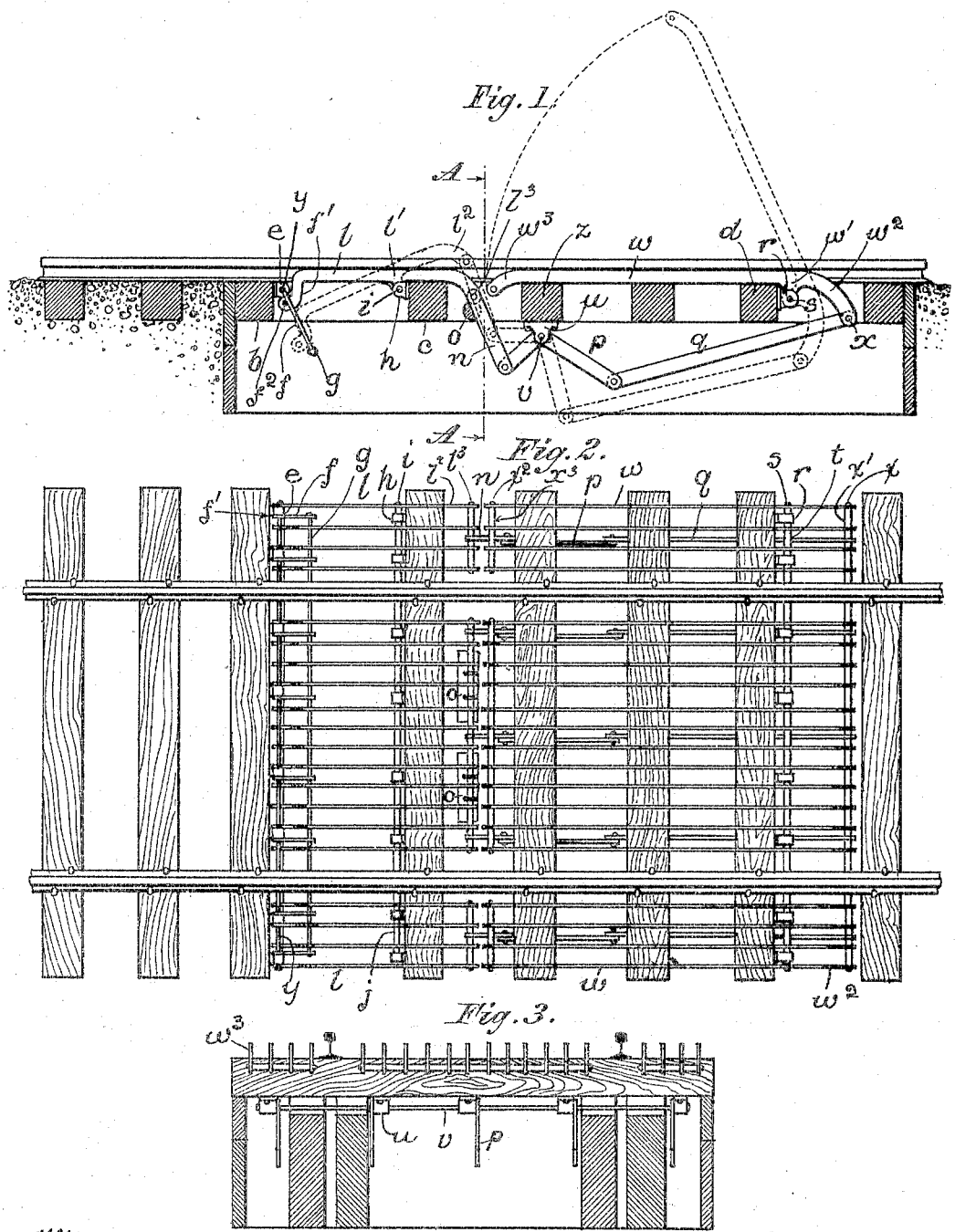

UNITED STATES PATENT OFFICE.

ABRAHAM G. HENDRYX, OF PORTLAND, OREGON, ASSIGNOR OF ONE-THIRD TO HENRY LANG, OF PORTLAND, OREGON.

CATTLE-GUARD.

SPECIFICATION forming part of Letters Patent No. 783,693, dated February 28, 1905.

Continuation of application Serial No. 195,900, filed February 27, 1904. This application filed October 15, 1904. Serial No. 228,629.

*To all whom it may concern:*

Be it known that I, ABRAHAM G. HENDRYX, a citizen of the United States, and a resident of Portland, county of Multnomah, State of Oregon, have invented a new and useful Improvement in Cattle-Guards for Railroads, of which the following is a specification, reference being had to the accompanying drawings as a part thereof, reference being also had to an application for a patent filed by me February 27, 1904, Serial No. 195,900, for cattle-guards, of which the present application is a continuation and an elaboration.

My invention has for its object to provide simple and durable means for preventing cattle while crossing a railroad-track on a road leading across the same to turn from the road onto the intersecting railroad-track; and to this end my invention consists of a gate-like contrivance normally resting on the road-bed of the track between the rails, but lifted to the upright position of a gate the moment an animal attempts to walk on the trackway. One of these contrivances is to be installed on either side of the road, so as to head off the cattle from attempting to go either up or down the track.

My gate-operating mechanism comprises a step or treadle on which the animal must tread when first heading to walk on the track and by stepping on which the gate-operating mechanism is thrown into action and the gate is lifted.

In the drawings, Figure 1 shows a longitudinal section of a railroad-track with my invention operatively installed therein. Fig. 2 is a plan view corresponding with Fig. 1, and Fig. 3 is a cross-section on a line A A of Fig. 1.

The letters designate the parts described.

In order to provide room for installing my mechanism, the ties must be arranged substantially as shown in Fig. 1.

My mechanism is operatively supported from the ties $b\ c\ z\ d$. To the tie $b$ are attached hinge-lugs $e$, supporting a rod $y$, on which are hinged a number of pendent arms $f$, the lower extremities of which are connected by a cross-rod $g$. The devices just described serve as a stop preventing the treadle of my mechanism from being unduly depressed when stepped upon by an animal. The same devices incidentally, of course, support the treadle against undue strain from the weight imposed by the animal stepping thereon. The treadle comprises a plurality of fulcrumed arms $l$ made with perforated lugs $l'$ to receive a rod $i$, by which the treadle-arms are pivotally supported on the hinge-lugs $h$, fastened to the tie $c$. The sections of the rod $i$ intermediate of the treadle-arms and the hinge-lugs are covered with short sections of pipe, serving to hold the treadle-arms against lateral displacement. The forward ends of the treadle-arms are made with goosenecks or curved sections $f'$, so that such extremities may be inserted between the pendent arms $f$, and after having been so inserted said extremities are rigidly connected by means of a rod $f^2$, (see Fig. 1,) thereby holding the same against disengagement from the treadle-stop above described. The inner ends $l^2$ of the treadle-arms are curved downward. Said inner ends are rigidly connected with each other by means of a rod $l^3$ and intermediate pipe-sections, and said ends are jointedly connected with the bell-crank $p$ by means of links.

The bell-cranks $p$ are hinged on a rod $u$, supported in hinged lugs $u$, fastened to the under side of the tie $z$, the bell-cranks being respectively secured against lateral displacement by intermediate sections of pipe in the same manner as described concerning the treadle-arms $l$. The rear extremities of the bell-cranks $p$ are jointedly connected by links $q$ with the short downwardly-curved ends $w^2$ of the levers $w$, which are hinged on a rod $s$, inserted through integral ears $w'$ of said levers and supported in hinge-lugs $r$. The rear ends of the lever $w$ are connected with the links $q$ by means of rods $x$ and intermediate pipe-sections $x'$, and the forward ends of the levers are connected by similar devices $x^2\ x^3$, the latter serving also the purpose of giving rigidity to the levers $w$. $o$ represents weights suspended from the rods $l^3$, connecting the rear ends of the treadle-arms $l$ for the purpose of weighting the inner ends of the treadle, so as to insure that the mechanism will speedily resume its normal condition as soon as the treadle is relieved of the weight of the animal stepping thereon.

The operation of my device is as follows: When an animal crossing the track on the intersecting roadway turns to go up or down the trackway, it will step on the treadle mechanism of my cattle-guard in attempting to proceed. The tilting of the treadle-bars will be transmitted through the described connecting devices to the levers $w$ and lift these to an upright position, simulating a fence. The instant the animal steps off the treadle-arms the levers $w$ will drop back to their normal or dormant position, leaving the track clear of all obstruction.

The treadle-arms $l$ in practice may be arranged about two inches apart, and the pendent arms $f$ of the stop for the treadle should be similarly arranged, the idea being to leave ample space for snow to fall through, but at the same time render it impossible for the animal to accidentally get his foot caught when stepping on the treadle.

The tracking is provided with longitudinal pits in which to instal those parts of my cattle-guard operating below the track, as above described.

Having fully described my invention, what I claim is—

1. In a cattle-guard the combination comprising a treadle consisting of a plurality of arms $l$, means pivotally supporting the treadle-arms from the sides of a tie, a plurality of levers $w$, means pivotally supporting the same from the side of a tie, means holding the treadle-arms and the levers respectively, against lateral displacement, bell-cranks $p$ means pivotally supporting the same from the under side of a tie, links connecting the treadle-arms, the bell-cranks and the levers, so that the latter will be lifted when the treadle-arms are stepped upon, and a stop adapted to prevent the undue tilting of the treadle, substantially as described.

2. In a cattle-guard comprising a treadle consisting of a plurality of arms $l$, means pivotally supporting the treadle-arms from the side of a tie, a plurality of levers $w$, means pivotally supporting the same from the side of a tie, means holding the treadle-arms and the levers respectively, against lateral displacement, bell-cranks $p$, means pivotally supporting the same from the under side of a tie, links connecting the treadle-arms, the bell-cranks and the levers so that the latter will be lifted when the treadle-arms are stepped upon, and means adapted to limit the depression of the treadle and comprising a plurality of pendent arms $f$, a transversely-disposed rod connecting said pendent arms; the front extremities $f$ of the treadle-arms being made with a curve like a gooseneck and inserted between said pendent arms, and a transverse rod connecting said curved extremities and preventing the disengagement thereof from said pendent arms.

In testimony whereof I have hereunto affixed my signature in the presence of two witnesses.

ABRAHAM G. HENDRYX.

Witnesses:
T. J. GEISLER,
ABA HENDRYX.